United States Patent [19]
David

[11] 3,902,733
[45] Sept. 2, 1975

[54] CONVERTIBLE TRAILER DOLLY EQUIPMENT

[76] Inventor: Jean L. David, 3 route de Pont Sainte-Maxence, 60 Senlis, France

[22] Filed: Apr. 23, 1974

[21] Appl. No.: 463,253

[30] Foreign Application Priority Data
Apr. 24, 1973   France .............................. 73.14806

[52] U.S. Cl. ............ 280/47.18; 280/47.31; 280/475
[51] Int. Cl. ................................................ B62b 1/20
[58] Field of Search ............. 280/47.18, 47.31, 47.3, 280/150.5, 475; 224/42.01

[56] References Cited
UNITED STATES PATENTS

| | | | |
|---|---|---|---|
| 2,416,492 | 2/1947 | Neely | 280/47.3 |
| 2,742,300 | 4/1956 | Carver | 280/47.31 |
| 3,360,282 | 12/1967 | Dugan | 280/475 |

FOREIGN PATENTS OR APPLICATIONS

| | | | |
|---|---|---|---|
| 977,329 | 12/1964 | United Kingdom | 280/150.5 |

*Primary Examiner*—David Schonberg
*Assistant Examiner*—John A. Pekar
*Attorney, Agent, or Firm*—William R. Woodward

[57] ABSTRACT

The nose structure of a trailer vehicle in the vicinity of the hitch is provided with a bracket on which is mounted a telescoping support strut extensible against the tension of an internal spring by means of a manually operable hydraulic jack. A carrier tray of metal rod and tube lattice work is demountably affixed to the trailer frame in the neighborhood of the hitch. A jockey wheel can be attached demountably either to the foot of the telescoping strut or, after the carrier is detached from the trailer, to the carrier, so as to form in the latter case a wheel barrow that is completed by the attachment of arms for handles. With the jockey wheel attached to the strut the trailer may be maneuvered in its parking site or for hitching, whereas when the wheel is used in the wheelbarrow assembly, a means for transporting loads such as butane gas containers, service tanks of water or compressed air, baggage or supplies is provided.

4 Claims, 5 Drawing Figures

CONVERTIBLE TRAILER DOLLY EQUIPMENT

The present invention relates to a convertible dolly particularly useful for recreational trailers, such as those used for touring and camping. The dolly of this invention comprises a swiveled jockey wheel structure usable either for maneuvering the nose of a trailer, or with a carrier to which detachable arms may be affixed to constitute an assembly in the form of a wheelbarrow for transporting small loads in the general neighborhood of a stationary trailer.

The users of so-called camping or "caravan" trailers providing compact trailer-mounted living facilities run into two important difficulties commonly requiring an inconvenient amount of physical strength to overcome: the first involving maneuvering the trailer for hitching it to or unhitching it from the towing vehicle and, second, the necessity of transporting steel bottles of butane, service tanks of water or compressed air, baggage, garbage containers, etc., between places of supply or disposal and the campsite or other location where the trailer may be situated.

It is an object of the present invention to overcome these difficulties by providing a double-purpose equipment usable both to facilitate maneuvering of the trailer and the carrying of heavy articles to and from the trailer when it is parked.

SUBJECT MATTER OF THE PRESENT INVENTION

Briefly, a double-purpose equipment is provided that comprises an extensible strut and a detachable jockey wheel that when removed from the strut may be fastened to a carrier which likewise is normally carried on the trailer hitch structure, preferably in its upper part, the carrier also being detachable. When the trailer is parked, the jockey wheel can be separated from the strut and mounted on the carrier, the carrier having first been detached from the hitch, after which two arms can be attached to complete a wheel After use in this form, the jockey wheel and the carrier can be returned to their mountings on the hitch structure.

The extensible strut preferably comprises two concentric tubes containing a spring within them which is fastened to the respective tubes at its extremities and tends to shorten the strut by telescoping the tubes, and a manually operable hydraulic jack affixed to the exterior tube having a piston bearing on the interior tube and acting against the spring. The fork of the jockey wheel is then fixed to the interior tube of the telescoping pair by means such as a removable linch pin. The carrier in that case is likewise provided with means for attachment to the fork of the jockey wheel by the same or another linch pin. Preferably firm attachment of the carrier to the trailer hitch structure is facilitated by the provision of a wing-nut fastening.

The invention is further described below by way of a specific example with reference to the annexed drawings, in which.

Figure 1:
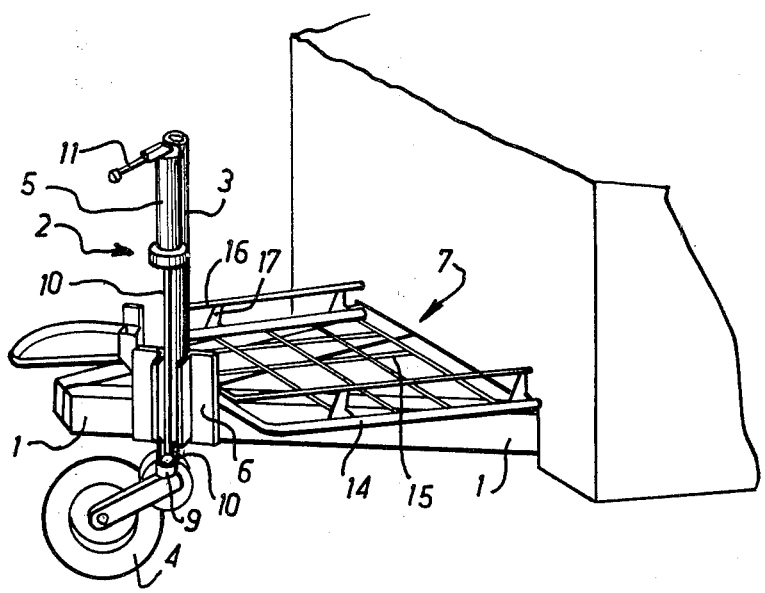
FIG. 1 is a perspective view of a convertible dolly according to the invention mounted on the hitch structure of a trailer.

In FIG. 1 reference numeral 1 designates the front end of the frame of the trailer, herein generally referred to as the hitch structure, because the trailer-mounted portion of the hitch, not visible in this view, is contained in its extremity. At one side of the hitch structure 1 is mounted a support strut 2 formed of two telescoping tubes 3 at the lower extremity of which is affixed a detachable swivelled jockey wheel 4. The support strut 2 is equipped with a manually operable hydraulic jack 5 and is firmly fastened to the hitch structure 1 by means of a bracket 6 which may, for example, be bolted in position.

A carrier tray 7 built of tube and rod members welded together in a suitable lattice form, is mounted on the upper part of the hitch structure 1 of the trailer. The carrier 7 is removable from the hitch structure, but is held in place by suitable fastening, such as bolts and wing nuts (not shown), for example. The forward portion of the carrier 7 is provided with a tubular member 8 of square cross-section that is designed to receive the pivot of the wheel 4.

Figure 2:
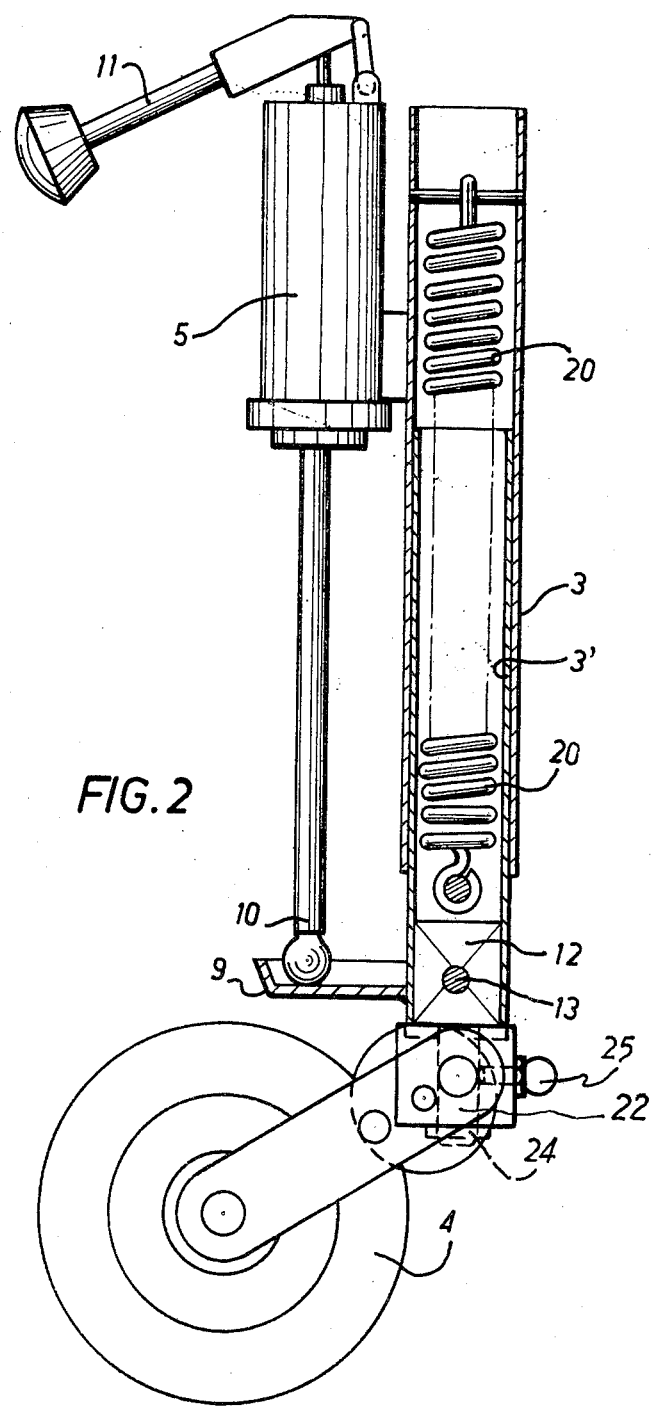
FIG. 2 is a detailed view, in elevation and partly in section, of the supporting strut and the jockey wheel of the assembly of FIG. 1.

FIG. 2 shows the support strut 2 in greater detail. It is formed of two telescoping tubes 3 and 3' on the inside of which is located a spring 20 tending to raise the wheel 4. One of the extremities of the tube 3' is provided with a cupped bracket 9 against which the piston rods 10 of the hydraulic jack 5 bears. This jack is manually operable by means of a lever 11. The pivot 12 of the wheel 4 is lodged in the lower extremity of the tube 3'. It is of square cross-section and is held in place by a removable pin 13. The entire assembly shown in FIG. 2 is affixed to the hitch frame structure 1 of the trailer by means of a bracket 6 (FIG. 1) bolted to the hitch structure 1. When the lever 11 is actuated, the piston rod 10 of the hydraulic jack 5 acts on the cup bracket 9 and lowers the wheel 4 against the force of the spring 20. To raise the wheel the lever 11 must be pulled, which opens a valve (not shown) in a well known manner, allowing the piston rod 10 to be pushed up by the force of the spring 20, resulting in lowering the hitch structure of the trailer towards the ground. If another support is provided before the lever 11 is pulled out, however, as for example a fixed prop or the towing vehicle and its hitch, the effect of allowing the piston rod 10 to rise is to raise the wheel 4 off the ground. When the wheel 4 is thus raised, it can readily be removed by pulling out the pin 13.

Figure 3:
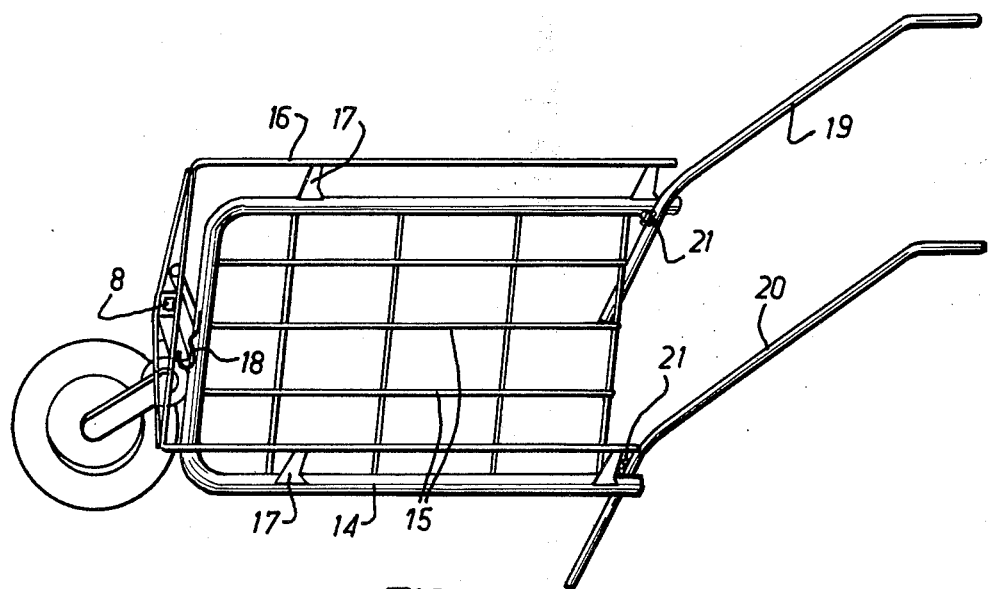
FIG. 3 is a perspective view of the wheelbarrow constituted by mounting the jockey wheel and removable arms on the carrier.

FIG. 3 shows the wheelbarrow that may be assembled by unmounting the carrier 7 and the wheel 4 from the trailer hitch frame 1 and the support strut 2 respectively and fastening them together. The carrier 7 forming the body of the wheelbarrow is made of a frame 14 of bent metal tubing, to the underside of which a lattice structure of thin metal rods 15 is welded. The bent rod 16 supported on strut 17 forms the retaining sides of the wheelbarrow.

At the front of the wheelbarrow thus formed a tube 8 of square cross-section is welded, which receives the pivot 12 of the wheel 4, the latter being held in place by a removable pin 18. Detachable arms 19 and 20 are fastened to the carrier 7 to form the handles of the wheelbarrow.

Figure 4:
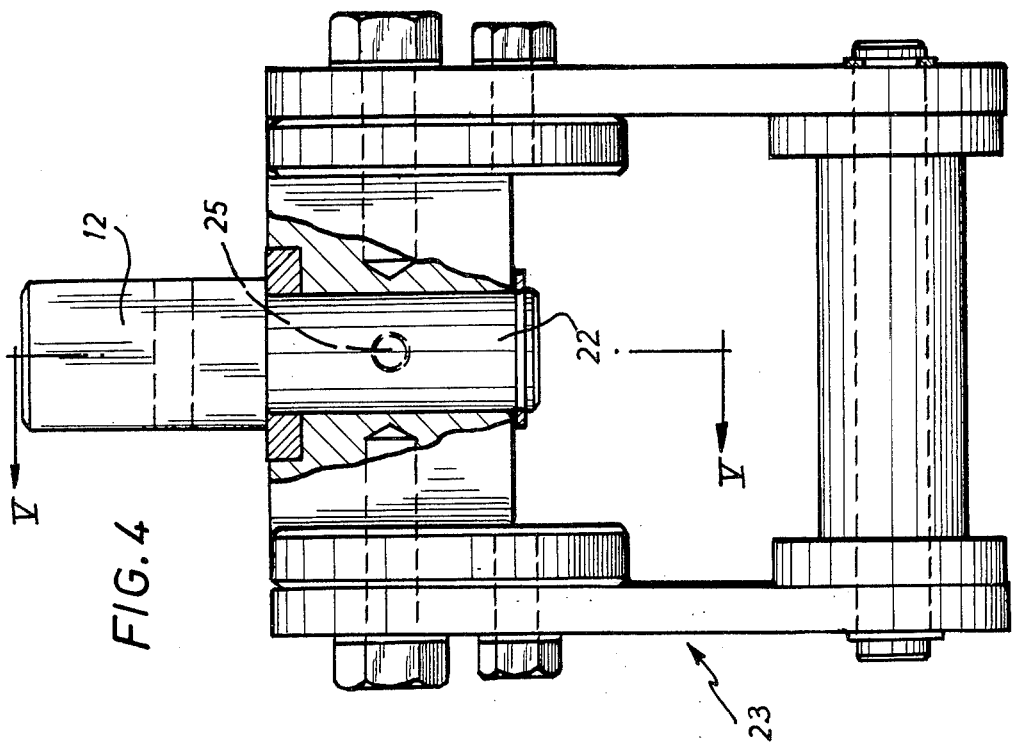
FIG. 4 is a detail end view, partly in section, of the jockey wheel, with the wheel removed.
Figure 5:
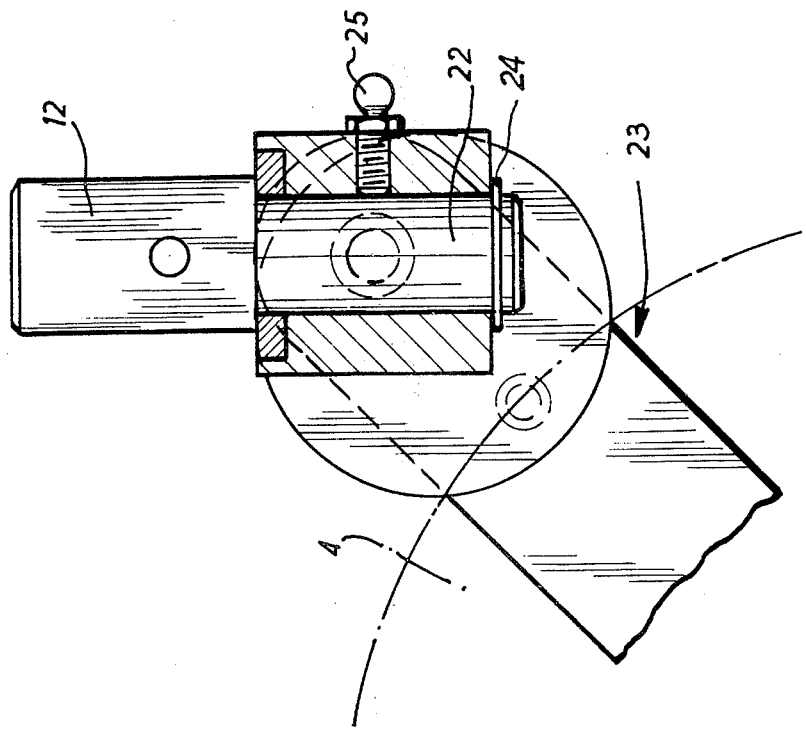
FIG. 5 is a section along the line V—V of FIG. 4.

It is desirable that the wheel 4 should swivel when used as a jockey wheel for the trailer, but should not swivel when forming part of the wheelbarrow shown in FIG. 3. For this purpose, according to the embodiment shown in FIGS. 4 and 5, the square cross-section part 12 of the pivot is provided at its lower portion by a cylindrical part 22. The fork 23 of the wheel 4 is bored so that it may be engaged around the cylindrical part 22 and fixed thereon by means such as an elastic segment 24.

In these conditions, it is obvious that the wheel should swivel around the part 22 when used as a jockey wheel for the trailer, whilst a locking means 25 allows to block the fork 23 on the part 22 in the required position when the wheel 4 is used in wheelbarrow service.

Although the invention has been described with respect to a particular embodiment, modifications and variations are possible within the inventive concept.

The device of this invention making double-purpose use of a jockey wheel, is a highly practical aid to trailer touring that makes minimum demand on the limited storage space available in touring trailers.

I claim:

1. Double-purpose rolling equipment attachable to a trailer vehicle for service as a nose wheel therefor and combinable by assembly into a wheelbarrow with carrier structure normally carried by the trailer vehicle when the trailer vehicle is parked, said rolling equipment comprising, in combination:

a. a jockey wheel mounted on journal bearings provided in a fork member, said fork member having a stem end constituted as a member of a swivel joint;

b. means for locking said swivel joint of which said fork member is one member, so that in the unlocked condition of said locking means said jockey wheel is permitted to swivel and in the locked condition of said locking means the swivel joint does not permit said jockey wheel to swivel, and c. carrier means assemblable to the foregoing means, said carrier means comprising lattice work forming the tray and sides of a barrow, separable rod means for providing handle and support members for manoeuvering said barrow, and mounting means for effectively forming at least a part of a fixed member of said swivel joint.

2. Rolling equipment as defined in claim 1 in which part of said fork member provides the female member of said swivel joint and in which said locking means comprise screw means seated in said female member for selectively blocking or unblocking relative movement of the members of said swivel joint.

3. Rolling equipment as defined in claim 1 in which the member of said swivel joint other than that provided as a portion of said fork member is a separable unit having a portion shaped for nonrotatable engagement in said mounting means of said carrier means and, likewise, for non-rotatable engagement in a mating member mounted on a trailer vehicle.

4. Rolling equipment as defined in claim 3 in which said portion of said swivel member shaped for non-rotatable engagement with said mounting means of said carrier means is provided with means for accepting a locking pin for fixing said member in said non-rotating engagement.

* * * * *